US012566329B2

(12) United States Patent
Liu et al.

(10) Patent No.: US 12,566,329 B2
(45) Date of Patent: Mar. 3, 2026

(54) DIFFRACTIVE IMAGE COMBINER, DISPLAY DEVICE MODULE, AND HEAD-MOUNTED DISPLAY DEVICE

(71) Applicants: Huawei Technologies Co., Ltd., Shenzhen (CN); Beijing Institute of Technology, Beijing (CN)

(72) Inventors: Juan Liu, Beijing (CN); Zhihao Xing, Beijing (CN); Xinhui Duan, Beijing (CN)

(73) Assignees: Huawei Technologies Co., Ltd., Shenzhen (CN); Beijing Institute of Technology, Beijing (CN)

( * ) Notice: Subject to any disclaimer, the term of this patent is extended or adjusted under 35 U.S.C. 154(b) by 815 days.

(21) Appl. No.: 17/850,718

(22) Filed: Jun. 27, 2022

(65) Prior Publication Data

US 2022/0326532 A1    Oct. 13, 2022

Related U.S. Application Data

(63) Continuation of application No. PCT/CN2020/138822, filed on Dec. 24, 2020.

(30) Foreign Application Priority Data

Dec. 27, 2019    (CN) .......................... 201911379816.9

(51) Int. Cl.
    *G02B 27/01*    (2006.01)
    *G02B 5/32*    (2006.01)
                    (Continued)
(52) U.S. Cl.
    CPC ........... *G02B 27/0172* (2013.01); *G02B 5/32* (2013.01); *G02B 27/102* (2013.01); *G02B 27/4205* (2013.01); *G02B 2027/0178* (2013.01)

(58) Field of Classification Search
    CPC .............. G02B 27/0172; G02B 27/102; G02B 27/4205; G02B 5/32; G02B 2027/0178
                    (Continued)

(56) References Cited

U.S. PATENT DOCUMENTS

2018/0275407 A1    9/2018    Choi et al.
2020/0301147 A1*   9/2020    Klug .................... H04N 13/395

FOREIGN PATENT DOCUMENTS

CN    104614858 A    5/2015
CN    105122561 A    12/2015
                    (Continued)

OTHER PUBLICATIONS

Park et al., "Optical see-through holographic near-eye-display with eyebox steering and depth of field control," Optics Express, vol. 26, No. 21, pp. 27076-27088 (Oct. 15, 2018).
                    (Continued)

*Primary Examiner* — Bumsuk Won
*Assistant Examiner* — Grant A Gagnon
(74) *Attorney, Agent, or Firm* — Leydig, Voit & Mayer, Ltd.

(57)    ABSTRACT

A diffractive image combiner is provided, to increase an exit pupil dimension, thereby improving user experience. The diffractive image combiner includes a first diffractive optical element (DOE) and a second DOE. The first DOE is parallel to the second DOE. A grating vector of a first incidence point in the first DOE is the same as a grating vector of a second incidence point in the second DOE. The first incidence point is used to convert an incident light ray that meets a Bragg condition into a first diffracted light ray and a first transmitted light ray. The first transmitted light ray is incident to the second incidence point. The second incidence point is used to convert the first transmitted light ray into a second diffracted light ray.

20 Claims, 10 Drawing Sheets

(51) Int. Cl.
  *G02B 27/10*  (2006.01)
  *G02B 27/42*  (2006.01)
(58) Field of Classification Search
  USPC ........................................................ 359/630
  See application file for complete search history.

(56) References Cited

FOREIGN PATENT DOCUMENTS

| | | | |
|---|---|---|---|
| CN | 108387960 | A | 8/2018 |
| CN | 109863435 | A | 6/2019 |
| CN | 209167695 | U | 7/2019 |
| CN | 110082907 | A | 8/2019 |
| CN | 110221430 | A | 9/2019 |
| CN | 110456512 | A | 11/2019 |
| CN | 209728327 | U | 12/2019 |
| WO | 2017120326 | A1 | 7/2017 |

OTHER PUBLICATIONS

Jang et al., "Holographic Near-eye Display with Expanded Eye-box," ACM Trans. Graph., vol. 37, No. 6, Article 195, Total 14 pages (Publication date: Nov. 2018).
Maimone et al., "Holographic Near-Eye Displays for Virtual and Augmented Reality," ACM Transactions on Graphics, vol. 36, No. 4, Article 85, Total 16 pages (Publication date: Jul. 2017).
BLOK "Diffraction by a double grating," Applied Scientific Research, vol. 26, No. 1, XP093039026, pp. 389-397, Springer (Dec. 1972).

* cited by examiner

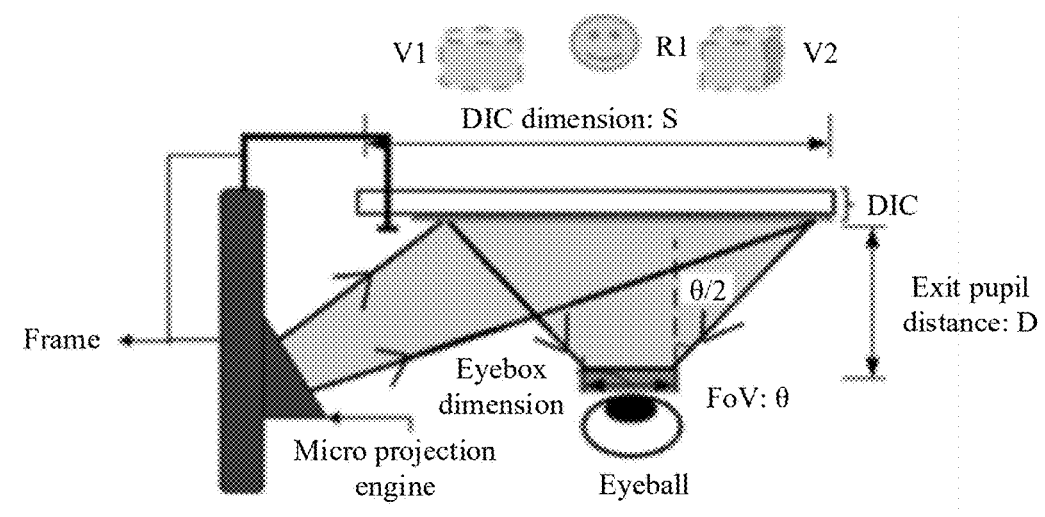
FIG. 3
FIG. 4
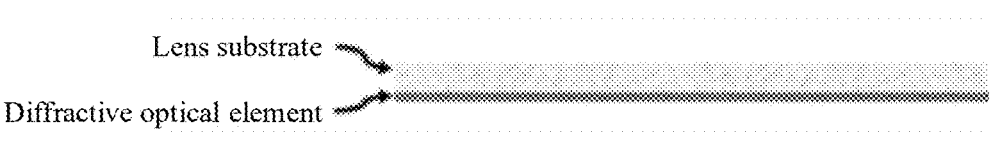
FIG. 5

Second diffractive structure 102

Substrate 101

First diffractive structure 103

Exit pupil 104

Eyeball 105

Real image plane 106

Second diffractive structure

Substrate

First diffractive structure

Image point

DIFFRACTIVE IMAGE COMBINER, DISPLAY DEVICE MODULE, AND HEAD-MOUNTED DISPLAY DEVICE

CROSS-REFERENCE TO RELATED APPLICATIONS

This application is a continuation of International Application No. PCT/CN2020/138822, filed on Dec. 24, 2020, claims priority to Chinese Patent Application No. 201911379816.9, filed on Dec. 27, 2019. The disclosures of the aforementioned applications are hereby incorporated by reference in their entireties.

STATEMENT OF JOINT RESEARCH AGREEMENT

The subject matter and the claimed invention were made by or on the behalf of Beijing Institute of Technology, of Haidian District, Beijing, P.R. China and Huawei Technologies Co., Ltd., of Shenzhen, Guangdong Province, P.R. China, under a joint research agreement titled "Diffractive Image Combiner, Display Device Module, and Head-mounted Display Device". The joint research agreement was in effect on or before the claimed invention was made, and that the claimed invention was made as a result of activities undertaken within the scope of the joint research agreement.

TECHNICAL FIELD

Embodiments of this application relate to the optical field, and in particular, to a diffractive image combiner, a display device module, and a head-mounted display device.

BACKGROUND

An augmented reality (AR) near-eye display technology is a wearable display system that enables, by using a specific optical system, human eyes to see a computer-generated virtual scene while seeing an external real scene. In an AR system, a computing component analyzes and processes a real scene observed by a user, and then combines generated virtual augmented information into the real scene by using the near-eye display technology, to implement seamless fusion between real and virtual scenes, thereby assisting the user in deeply and comprehensively recognizing the real world. As one of core technologies of an AR device, the near-eye display technology also becomes a current hot research topic in the industry and academia.

A core task of the AR near-eye display technology is to perform virtuality-reality combination, that is, allow both a light ray in the real-world and a light ray in a virtual image to pass through, to reach human eyes. A near-eye display technology based on diffractive optics can effectively reduce a dimension and a weight of an optical component, and therefore has become a hot research topic in recent years. An AR near-eye projection solution based on a Maxwellian view method principle and a diffractive image combiner (DIC) can greatly improve a field of view (FoV) of AR near-eye display, namely, an opening angle of a virtual-image presentation range relative to a human eye. For example, the FoV is at least 80 degrees.

Subject to an angular bandwidth of the DIC component, a pixel dimension of an SLM image source component, or an optical path of a laser beam retina scanning mechanism, an exit pupil dimension of the AR near-eye projection solution based on the Maxwellian view method principle and the DIC component is relatively small, for example, is 1 millimeter. Because a virtual image can be seen only when a pupil of the human eye has an overlapping area with an Eyebox in space, if the Eyebox is excessively small, a user is prone to lose the image, severely reducing user experience.

SUMMARY

Embodiments of this application provide a diffractive image combiner that is based on a micro-nano optical technology, to expand a system exit pupil, thereby improving user experience.

A first aspect of embodiments of this application provides a diffractive image combiner, including a first diffractive optical element (DOE) and a second DOE. The first DOE is parallel to the second DOE. A grating vector of a first incidence point in the first DOE is the same as a grating vector of a second incidence point in the second DOE. The first incidence point is used to convert an incident light ray that meets a Bragg condition into a first diffracted light ray and a first transmitted light ray. The first transmitted light ray is incident to the second incidence point. The second incidence point is used to convert the first transmitted light ray into a second diffracted light ray.

The diffractive image combiner provided in this embodiment of this application includes at least two diffractive optical elements (DOEs). The first incidence point in the first DOE may be used to convert an incident light ray whose projection angle falls within a Bragg domain into the first diffracted light ray and the first transmitted light ray. First diffracted light rays form a first exit pupil of a system. The first transmitted light ray may be incident to the second incidence point in the second DOE. The second incidence point converts the incident first transmitted light ray into the second diffracted light ray. Second diffracted light rays form a second exit pupil of the system. Because the grating vector of the first incidence point is the same as the grating vector of the second incidence point, the second diffracted light ray is parallel to the first diffracted light ray, and an exit pupil dimension determined based on the first exit pupil and the second exit pupil is greater than an exit pupil dimension of a diffractive image combiner with only a single diffractive optical element. Therefore, an exit pupil dimension of the diffractive image combiner provided in this application increases, so that a user is not prone to lose an image, thereby improving user experience.

The light ray incident based on the Bragg condition is incident at the first incidence point, and the first transmitted light ray propagates to the second incidence point for incidence. Therefore, it can be ensured that the first diffracted light ray and the second diffracted light ray are parallel to each other, so that no crosstalk occurs when the user observes a virtual image.

In a possible implementation of the first aspect, a first grating area is disposed in the first DOE, a second grating area is disposed in the second DOE, the first grating area is used to convert first parallel incident beams whose projection angles fall within the Bragg domain into first diffracted beams and first transmitted beams, the first diffracted beams converge at a first focal point, the first transmitted beams are incident to the second grating area, the second grating area is used to convert the first transmitted beams into second diffracted beams, the second diffracted beams converge at a second focal point, and a distance from the first focal point to the diffractive image combiner is equal to a distance from the second focal point to the diffractive image combiner.

In a possible implementation of the first aspect, a first grating area is disposed in the first DOE, a second grating area is disposed in the second DOE, the first grating area is used to convert first parallel incident beams whose projection angles fall within the Bragg domain into first diffracted beams and first transmitted beams, the first diffracted beams converge at a first focal point through diffraction, the first transmitted beams are incident to the second grating area, the second grating area is used to convert the first transmitted beams into second diffracted beams, the second diffracted beams converge at a second focal point through diffraction, and a distance from the first focal point to the diffractive image combiner is equal to a distance from the second focal point to the diffractive image combiner. The first incidence point is located in the first grating area, and the second incidence point is located in the second grating area. There is an equal-ratio scaling relationship between a diffraction structure of the first grating area and a diffraction structure of the second grating area. Specifically, in a plane direction in which the DOE extends, the diffraction structure of the second grating area is obtained by amplifying the diffraction structure of the first grating area at an equal ratio.

According to the diffractive image combiner provided in this embodiment of this application, the distance from the first focal point to the diffractive image combiner is equal to the distance from the second focal point to the diffractive image combiner, and the first focal point and the second focal point are located on a same side of the diffractive image combiner, that is, a connection line of the first focal point and the second focal point is parallel to a plane on which any DOE of the diffractive image combiner is located. Therefore, a field of view formed by the diffracted beams of the first DOE are the same as a field of view formed by the diffracted beams of the second DOE, and virtual images presented in an eye of the user after beams emitted by a same image point are diffracted through different DOEs overlap, so that no crosstalk occurs.

In a possible implementation of the first aspect, the incident light ray and the first diffracted light ray are located on a same side of the first DOE; or the incident light ray and the first diffracted light ray are located on different sides of the first DOE.

According to the diffractive image combiner provided in this embodiment of this application, if each DOE is implemented by using a reflective DOE, the incident light ray and the first diffracted light ray are located on a same side of the first DOE, that is, a micro projection engine and the human eye of the user for observation may be located on a same side; or if each DOE is implemented by using a transmissive DOE, the incident light ray and the first diffracted light ray are located on different sides of the first DOE, that is, a micro projection engine and the human eye of the user for observation may be located on different sides. Therefore, different near-eye display projection solutions can be designed, thereby improving solution implementation flexibility.

In a possible implementation of the first aspect, the first DOE is a micro-nano optical component, and includes a volume holographic grating VHG, a surface rising grating SRG, a metasurface, or a micro lens array; and the second DOE is a micro-nano optical component, and includes a volume holographic grating VHG, a surface rising grating SRG, a metasurface, or a micro lens array.

According to the diffractive image combiner provided in this embodiment of this application, there may be a plurality of types of diffractive optical elements, thereby improving solution implementation diversity.

In a possible implementation of the first aspect, the DIC further includes a third DOE parallel to the second DOE, the second DOE is located between the first DOE and the third DOE, a grating vector of a third incidence point in the third DOE is the same as the grating vector of the second incidence point, the second incidence point is further used to convert the first transmitted light ray into the second diffracted light ray and a second transmitted light ray, the second transmitted light ray is incident to the third incidence point, and a third grating area is used to convert the second transmitted light ray into a third diffracted light ray.

The diffractive image combiner provided in this embodiment of this application may include a third DOE. The grating vector of the third incidence point in the third DOE is the same as both the grating vectors of the second incidence point and the first incidence point, and emergent third diffracted light rays form a third exit sub-pupil, so that an exit pupil can be further expanded. In addition, the emergent second diffracted light ray and third diffracted light ray are parallel to each other, and a same virtual image is presented in the eye of the user after light rays emitted by a same image point are diffracted through different DOEs, so that no crosstalk occurs.

In a possible implementation of the first aspect, the third grating area is disposed in the third DOE, the first grating area is used to convert the first parallel incident beams whose projection angles fall within the Bragg domain into the first diffracted beams and the first transmitted beams, the first diffracted beams converge at the first focal point, the first transmitted beams are incident to the second grating area, the second grating area is used to convert the first transmitted beams into second diffracted beams and second transmitted beams, the second diffracted beams converge at a second focal point, the second transmitted beams are incident to the third grating area, the third grating area is used to convert the third transmitted beams into third diffracted beams, the third diffracted beams converge at a third focal point through diffraction, and a distance from the third focal point to the diffractive image combiner is equal to both the distance from the second focal point to the diffractive image combiner and the distance from the first focal point to the diffractive image combiner. The third incidence point is located in the third grating area. There is an equal-ratio scaling relationship between a diffraction structure of the third grating area and the diffraction structure of the second grating area.

According to the diffractive image combiner provided in this embodiment of this application, because the distance from the third focal point to the diffractive image combiner is equal to both the distance from the second focal point to the diffractive image combiner and the distance from the first focal point to the diffractive image combiner, and the first focal point, the second focal point, and the third focal point are all located on a same side of the diffractive image combiner, that is, a plane including the first focal point, the second focal point, and the third focal point is parallel to a plane on which any DOE of the diffractive image combiner is located. Therefore, a field of view formed by the third diffracted beams is the same as the field of view formed by the second diffracted beams and is also the same as the field of view formed by the first diffracted beams, that is, diffracted beams formed after incident beams within the Bragg domain are diffracted through a plurality of DOEs form a same field of view. Virtual images presented in the eye of the user after beams emitted by a same image point are diffracted through different DOEs overlap, so that no crosstalk occurs According to the diffractive image combiner provided in this embodiment of this application, a plurality of diffraction structures are introduced, a correspondence between the diffraction structures is designed, so that a pupil expansion effect can be implemented without crosstalk while a value of a system field of view is kept unchanged.

In a possible implementation of the first aspect, the diffractive image combiner further includes a substrate disposed between the first DOE and the second DOE, where upper and lower surfaces of the substrate are optically parallel.

According to the diffractive image combiner provided in this embodiment of this application, a substrate may be filled between a plurality of diffractive optical elements, so that a specific optical path can be provided, thereby facilitating exit pupil expansion.

In a possible implementation of the first aspect, a material of the substrate is an optical transparent material, and the optical transparent material includes glass or optical plastic.

According to the diffractive image combiner provided in this embodiment of this application, the substrate may include a plurality of types of materials, thereby improving solution implementation diversity.

In a possible implementation of the first aspect, diffraction efficiency of the first DOE is lower than diffraction efficiency of the second DOE.

In a possible implementation of the first aspect, the diffraction efficiency of the second DOE is lower than diffraction efficiency of the third DOE.

According to the diffractive image combiner provided in this embodiment of this application, diffractive efficiency of different diffractive optical elements is designed. Therefore, light intensity of diffracted light rays of the diffractive optical elements can be adjusted, so that exit sub-pupils have approximate light intensity, thereby improving user experience.

A second aspect of embodiments of this application provides a display device module, including a micro projection engine and the diffractive image combiner according to any one of the first aspect and the implementations. The micro projection engine is used to project incident light rays within the Bragg domain to the diffractive image combiner. The first diffracted light rays form a first exit sub-pupil, the second diffracted light rays form a second exit sub-pupil, and an exit pupil of the display device module includes the first exit sub-pupil and the second exit sub-pupil.

In a possible implementation of the second aspect, the micro projection engine includes a plane image source component or a scanning image source component, the plane image source component includes a space light modulator SLM image source component and an incoherent plane micro image source, and the scanning image source component includes a laser beam scanner LBS component.

In a possible implementation of the second aspect, the display device module further includes a frame, and the frame is used to fasten the micro projection engine and the diffractive image combiner.

In a possible implementation of the second aspect, the display device module further includes at least one of the following: a communications apparatus, a processor, and a power supply apparatus.

A third aspect of embodiments of this application provides an augmented reality AR device, including the display device module according to any one of the second aspect and the implementations.

A fourth aspect of embodiments of this application provides a virtual reality VR device, including the display device module according to any one of the second aspect and the implementations.

A fifth aspect of embodiments of this application provides a near-eye display device, including the display device module according to any one of the second aspect and the implementations.

A sixth aspect of embodiments of this application provides a head-mounted display device, including a left-eye display and a right-eye display. The left-eye display includes the diffractive image combiner according to any one of the first aspect and the implementations. The right-eye display includes the diffractive image combiner according to any one of the first aspect and the implementations.

According to the foregoing technical solutions, it can be learned that embodiments of this application have the following advantages.

The diffractive image combiner provided in embodiments of this application includes the at least two diffractive optical elements DOEs. The first DOE includes the first grating area that has a same diffraction structure as the second grating area of the second DOE. The first DOE and the second DOE may convert incident light rays whose projection angles fall within the Bragg domain into diffracted light rays, to respectively form the first exit sub-pupil and the second exit sub-pupil. Therefore, compared with a DIC with only one DOE, an exit pupil can be expanded. A larger exit pupil dimension can accommodate a difference between pupil distances of different users, and can further avoid an image loss caused by eye rotation, thereby improving user experience.

The display device module provided in embodiments of this application includes the diffractive image combiner DIC with the at least two diffractive optical elements DOEs that are parallel to each other. The first DOE includes the first grating area that has a same diffraction structure as the second grating area of the second DOE. The first DOE and the second DOE may respectively convert image light rays projected by the micro projection engine to the DIC to generate the first exit sub-pupil and the second exit sub-pupil. The second DOE replicates and translates the exit pupil formed by the first DOE. Therefore, compared with a DIC with only one DOE, an exit pupil can be expanded. A larger exit pupil dimension can accommodate a difference between pupil distances of different users, and can further avoid an image loss caused by eye rotation, thereby improving user experience.

In addition, according to the DIC that includes the at least two DOEs, there is a correspondence between the first grating area of the first DOE and the second grating area of the second DOE: An incidence point, of a light ray incident based on the Bragg condition, in the first grating area and an incidence point of the light ray in the second grating area have a same grating vector. Therefore, a light ray that is projected by any image point on a real image plane to the DIC and whose incidence angle falls within the Bragg domain is converted into approximately parallel light rays after passing through a plurality of diffractive optical elements of the diffractive image combiner, and the approximately parallel light rays enter the human eye and then are made corresponding to a unique image point on a retina. Therefore, pupil expansion can be implemented without crosstalk.

BRIEF DESCRIPTION OF DRAWINGS

FIG. 3 is a schematic diagram of an embodiment of a near-eye display system according to an embodiment of this application;

FIG. 4 is a schematic diagram of a field of view and an exit pupil dimension of a near-eye display system according to an embodiment of this application;

FIG. 5 is a schematic diagram of basic composition of a diffractive image combiner;

DESCRIPTION OF EMBODIMENTS

Figure 1:
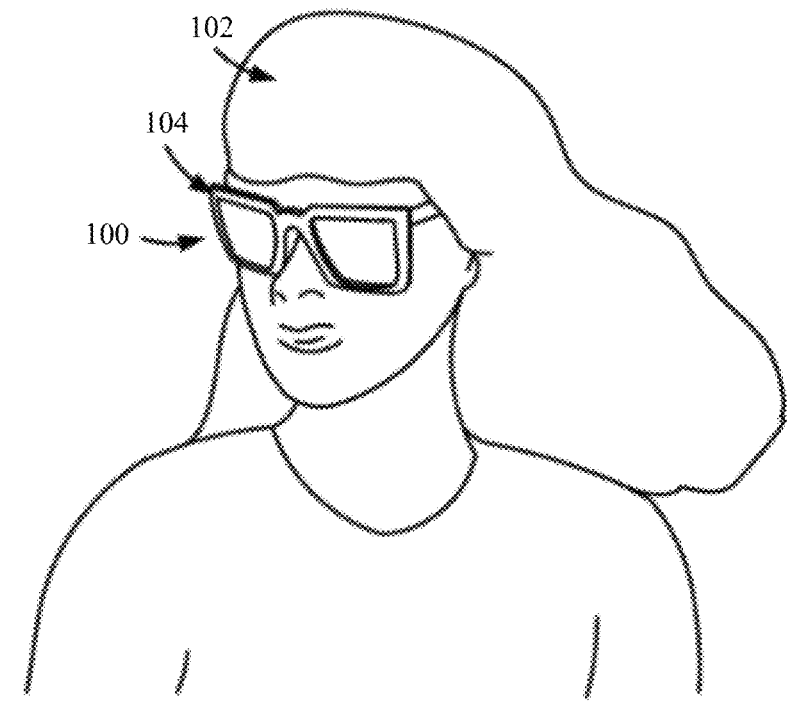
FIG. 1 is a schematic diagram of a head-mounted display device worn by a user.

The following describes embodiments of this application with reference to the accompanying drawings. It is clear that the described embodiments are merely a part rather than all of embodiments of this application. A person of ordinary skill in the art may learn that, with technology development and emergence of new scenarios, the technical solutions provided in embodiments of this application are also applicable to similar technical problems.

In the specification, claims, and accompanying drawings of this application, terms "first", "second", and the like are intended to distinguish between similar objects but do not necessarily indicate a specific order or sequence. It should be understood that data used in such a way are interchangeable in appropriate circumstances, so that embodiments described herein can be implemented in an order other than the order illustrated or described herein. Moreover, terms "include", "comprise", and any other variant thereof are intended to cover non-exclusive inclusion. For example, a process, a method, a system, a product, or a device that includes a series of steps or modules is not necessarily limited to those expressly listed steps or modules, but may include other steps or modules not expressly listed or inherent to the process, the method, the product, or the device. Naming or numbering of steps in this application does not mean that steps in a method procedure need to be performed in a time/logical sequence indicated by the naming or the numbering. An execution sequence of steps in a procedure that have been named or numbered may be changed based on a technical objective to be implemented, provided that a same or similar technical effect can be achieved.

For ease of understanding, technical terms in this application are first described as follows:

Diffraction grating: The diffraction grating is a grating for short, and is an optical apparatus and structure that can add periodic spatial modulation to an amplitude, a phase, or both of incident light. The diffraction grating includes a transmission grating (transmitted light is modulated) and a reflection grating (reflected light is modulated).

Grating vector: The grating vector is a grating vector at any point in a diffraction structure, namely, a light wave vector difference between object light and reference light at the point during preparation of the diffraction structure. Spatial distribution of grating vectors in a diffraction structure determines incident light ray angle and wavelength selectivity and a diffractive light ray direction of each point in the diffraction structure. An optical diffraction concept corresponding to the grating vector is a grating period. A change of the grating vector is reflected in a change of a grating period structure. Numerically, a product of a grating period and a grating vector at any point in a diffraction structure is equal to $2\pi$.

Bragg domain: A diffraction structure prepared based on a micro-nano processing technology such as a VHG, an SRG, or a metasurface is angle-selective for incident light. Only when an incidence angle of the incident light falls within a neighborhood range of a Bragg angle, the incident light is redirected by the diffraction structure. Otherwise, the incident light passes through the diffraction structure along a straight line. The neighborhood range of the Bragg angle is the Bragg domain.

Angular bandwidth of a grating: A diffraction structure prepared based on a technology such as a VHG, an SRG, or a metasurface is angle-selective for incident light. Only when an incidence angle of the incident light falls within a Bragg domain, the incident light is redirected by the diffraction structure. Projected light rays outside the angular bandwidth may pass through the grating without being redirected. The angular bandwidth of the grating is used to indicate a size of the Bragg domain, namely, a value of an angle range of an incident light ray that can be redirected by the diffraction structure.

Diffraction efficiency: The diffraction efficiency is a ratio of light intensity in a diffraction direction to incident light intensity. The diffraction efficiency is related to various parameters such as a material refractive index and a material thickness.

Exit pupil: An image formed by an aperture stop of an optical system in image space of the optical system is referred to as an "exit pupil" of the system. The exit pupil is also referred to as an eye movement range, and is usually referred to as an Eyebox. An exit pupil dimension is used to measure a size of the "exit pupil" of the system.

FIG. 1 is a schematic diagram of a head-mounted display device 100 worn by a user 102. The head-mounted display device 100 may be configured to display an augmented reality image and a physical object in a background scene in the real world. The head-mounted display device 100 may include a frame 104 for positioning the device at a target viewing position relative to the eyes of the user 102.

Figure 2:
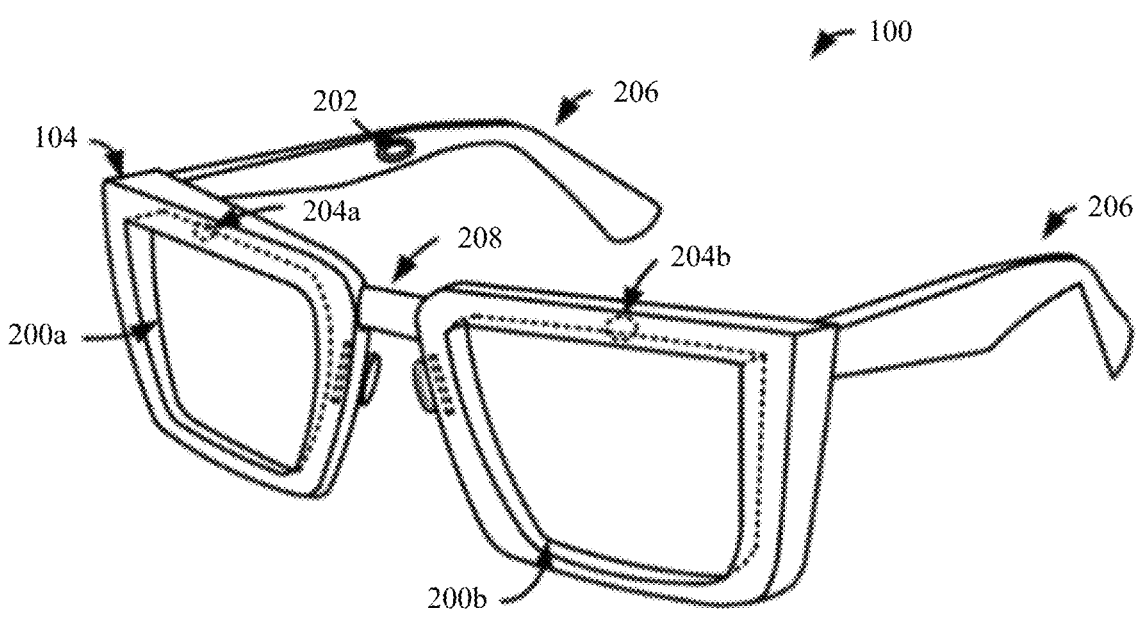
FIG. 2 is a schematic diagram of a head-mounted display device.

FIG. 2 is a schematic diagram of the head mounted display device 100 in FIG. 1. As shown in FIG. 2, the perspective head-mounted display device 100 includes a right-eye display 200a and a left-eye display 200b. Each perspective display (the right-eye display 200a or the left-eye display 200b) may be configured to display a virtual image to the user, and also allow the user to view a real-world environment. For example, each perspective display may include a display device configured to emit display light to the eyes of the user through an optical structure, and the display device may further allow ambient light in the real world to reach the eyes of the user. In addition, FIG. 2 schematically shows a microphone 202 that can be configured to output acoustic information to the user. Such acoustic information may be in any suitable form, and includes but is not limited to voice output that is in any suitable language (which is, for example, selected by the user) and that is generated by a computer, a tone or other sound that is not specially used for any language, and/or any other suitable sound. In some embodiments, another type of output may be provided by the head-mounted display device 100, for example, tactile/touch output.

The left-eye display 200b and the right-eye display 200a may be positioned at a viewing position relative to the eyes by using a fastening mechanism such as one or more frames 104. For example, as shown in FIG. 2, the frame 104 may be supported by the ear of the user by using an earpiece 206 and supported by the nose of the user by using a bridge 208, to reduce sliding of the frame 104. It should be understood that the supports (for example, the earpiece 206, nose pads, and the bridge 208) shown in FIG. 2 are essentially examples, and the perspective display of the perspective head-mounted display device may be positioned at the viewing position by using any suitable mechanism. For example, an additional support may be used, and/or one or more of the supports shown in FIG. 2 may be removed, replaced, and/or expanded, to position the perspective display at the viewing position. In addition, the perspective display may be positioned at the viewing position by using a mechanism other than a support that is physically in contact with the user. This is not limited in this application.

The following describes a relationship between a field of view and an exit pupil dimension in a near-eye display system. FIG. 3 is a schematic diagram of an embodiment of a near-eye display system according to an embodiment of this application.

An image formed by an aperture stop of an optical system in image space of the optical system is referred to as an "exit pupil" of the system. A micro projection engine projects a virtual image from a side surface to a DIC component. The DIC component directly redirects and emerges an incident light ray (for example, V1 and V2) within a characteristic angle range of the DIC component to an exit pupil position under a diffraction action, and also allows a light ray (for example, R1) in the external real world outside the characteristic angle range and a characteristic wavelength range to enter a pupil of a human eye by transparently passing through the DIC without being affected, to complete a virtuality-reality combination operation.

A DIC component dimension S is subject to a lens size and therefore cannot be excessively large, and usually cannot exceed 50 millimeters (mm). An exit pupil distance D is subject to facial physiological structures (a face type, eyebrows, eyelashes, and the like), and is usually greater than 20 mm. A diffraction angle of an image point on an object plane is subject to a pixel spacing of an image source component, and is usually small, for example, about 8 degrees (°). An Eyebox dimension is mainly subject to a diffraction angle of an SLM image source component and an angular bandwidth of the DIC component, and currently, usually does not exceed 3 mm in an actual system. An FoV is subject to the DIC component dimension S, the exit pupil distance D, and the Eyebox dimension, and currently, usually does not exceed 800 in an actual system.

FIG. 4 is a schematic diagram of a field of view and an exit pupil dimension of a near-eye display system according to an embodiment of this application.

The field of view is a presentation angle range of an image seen by a human eye. A user cannot see the image outside the angle range. An exit pupil is a space area. When an intersection set between a pupil of the eye and the area is non-empty, light rays emitted by all pixels on an image plane can be seen, that is, a complete image can be seen. Otherwise, the complete image cannot be seen.

Because a virtual image can be seen only when an overlapping area exists between a pupil of an eye and an Eyebox, to view the virtual image, the pupil of a user needs to overlap the Eyebox. If the overlapping area with the Eyebox disappears because the pupil moves, the image is lost, severely reducing user experience. As shown in FIG. 4, if a field of view is relatively large, an eyeball usually needs to rotate to completely observe an image in the field of view. It may be understood that a relatively large FoV needs to match a large Eyebox. Because a virtual image can be seen only when an overlapping area exists between a pupil of a human eye and an Eyebox, if the Eyebox is excessively small, a user is prone to lose the image, severely reducing user experience.

The following describes a common near-eye display system. Still refer to the near-eye display system shown in FIG. 3.

The near-eye display system usually includes a micro projection engine, a DIC component, and a frame structure used to fasten the two components. In addition, the near-eye display system may further include a related communications component, information processing component, power supply component, and the like. This is not specifically limited herein.

The micro projection engine, also referred to as a palmtop projector, has advantages such as a small volume, high brightness, and low noise, and has a broad application prospect in small business, home entertainment, near-eye display device, and the like. The micro projection engine may be implemented based on a plane image source component or a point image source component. The following separately provides descriptions.

The plane image source component includes various space light modulator (SLM) image source components, such as a liquid crystal on silicon (LCoS) micro display, and a digital micro-mirror display (DMD) micro display, and various incoherent plane image sources, such as a light-emitting diode (LED) micro display, an organic light-emitting diode (OLED) micro display, and a liquid crystal display (LCD) micro display.

The point image source component mainly includes a laser beam scanner (LBS) micro display.

A diffractive image combiner (DIC) is a DIC component for short in the following. The DIC component may perform wavefront modulation on a light wave to accurately control an emergence direction of an incident light ray. FIG. 5 is a schematic diagram of basic composition of a diffractive image combiner. The DIC component includes an optical transparent substrate in a lens shape, also referred to as a lens substrate, and a diffractive optical element (DOE) located on a surface of the substrate. The transparent substrate may be usually glass or optical plastic, and there is good optical parallelism between two surfaces of the substrate. The DOE may be a volume holographic grating (VHG) attached to the surface (an upper surface or a lower surface) of the transparent substrate, or a surface rising grating (SRG) directly processed on the surface of the transparent substrate by using a photoetching technology, or may be a metasurface, or the like. The DOE element is angle-selective and wavelength-selective for incident light, that is, only when an incidence angle and wavelength of the incident light fall within a characteristic angle range and a characteristic wavelength range of the DOE element, the incident light is redirected to a preset direction for emergence under a diffraction action of the DOE element. Otherwise, the incident light may pass through the DOE element along a straight line without being affected.

In an AR near-eye projection solution based on a Maxwellian view method principle and a DIC component, a micro projection engine projects a virtual image from a side surface to the DIC component. The DIC component directly redirects an incident light ray within a characteristic angle range of the DIC component to a pupil position of an observer, namely, an exit pupil position, under a diffraction action (a system optical path and a DOE element are designed, so that an incidence angle of an image light ray projected by the micro projection engine falls within a characteristic angle range of the DOE element at an incidence point), and also allows a light ray in the external real world to enter a pupil of the observer by transparently passing through the DIC without being affected (the system optical path and the DOE element are designed, so that an incidence angle of the light ray in the external real world falls within the characteristic angle range of the DOE element at the incidence point), to complete a virtuality-reality combination operation.

Figure 6A:
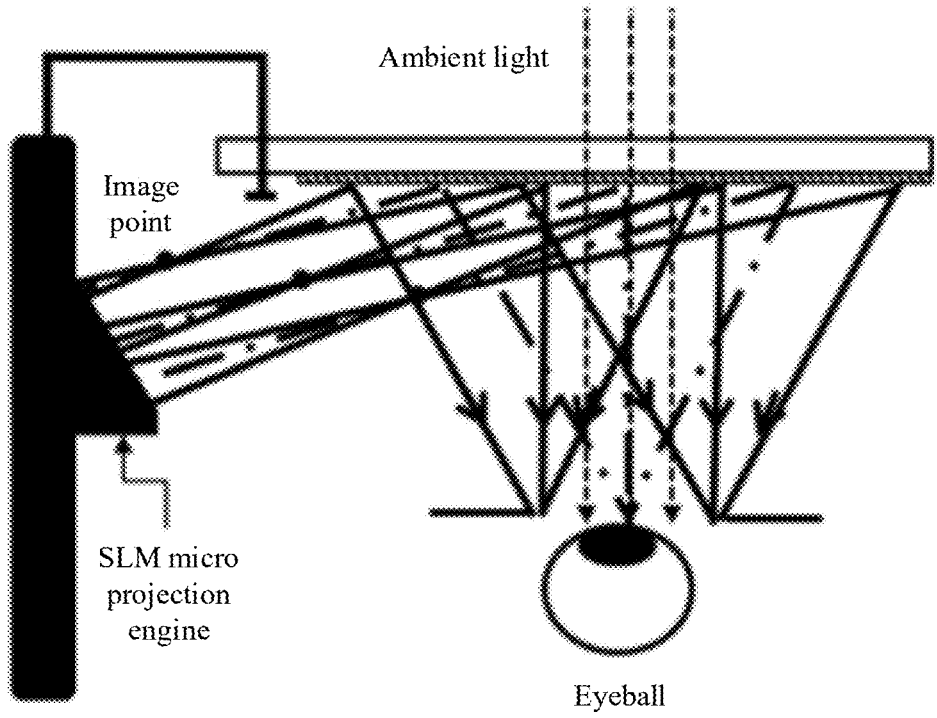
FIG. 6a shows a near-eye display system that is based on an SLM micro projection engine.
Figure 6B:
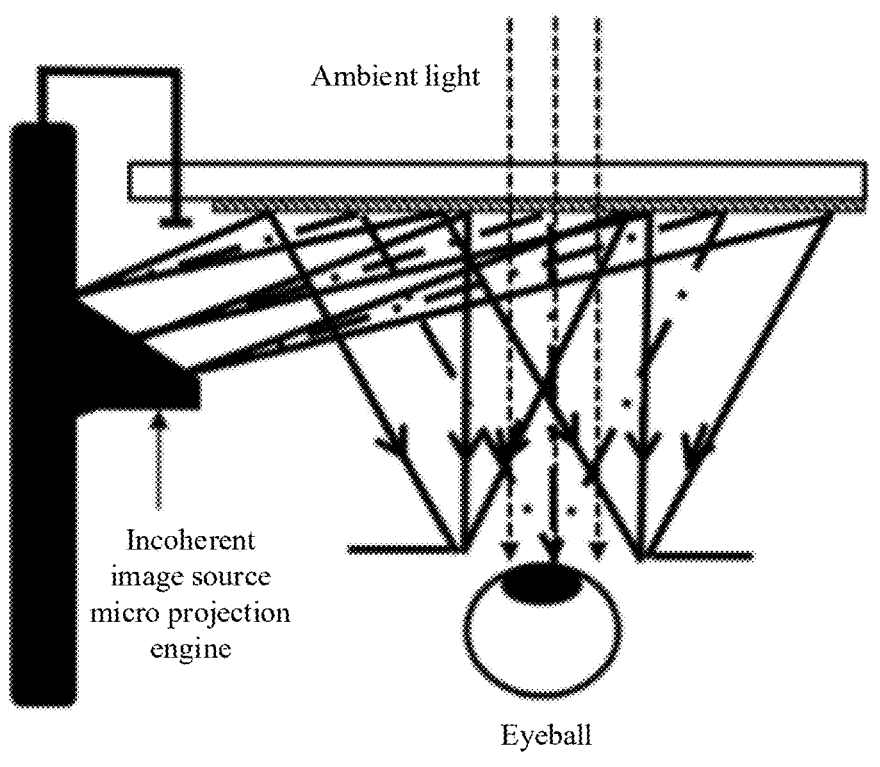
FIG. 6b shows a near-eye display system that is based on an incoherent plane image source micro projection engine.
Figure 6C:
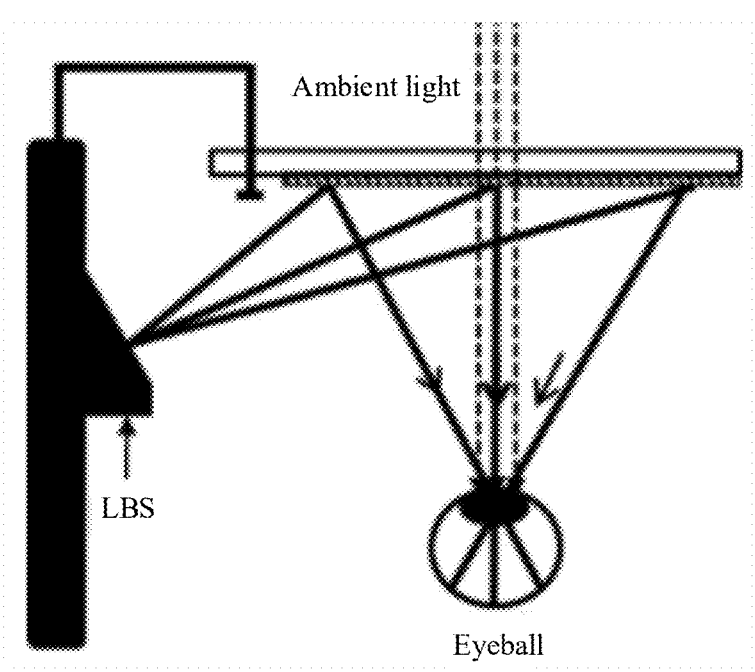
FIG. 6c shows a near-eye display system that is based on an LBS micro projection engine.

Referring to FIG. 6a to FIG. 6c, the following separately describes Eyebox limitation factors in different types of micro projection engines.

FIG. 6a shows a near-eye display system that is based on an SLM micro projection engine. The SLM component modulates incident coherent light, to generate a real image plane of a visible image through diffraction, and project the real image plane to a DIC component. The DIC component converges parallel beams of image points on the image plane in a same projection direction at one exit pupil point under a diffraction action, and a spacing between exit pupil points generated by converging, through the DIC, edge light rays projected by the image points to the DIC forms an exit pupil (Eyebox) of the system. It can be intuitively seen from FIG. 6a that, an exit pupil dimension is subject to a diffraction angle of each image point and an angular bandwidth of a grating in the DIC component. Because the diffraction angle of the image point is subject to a pixel spacing of an image source component, the diffraction angle of the image point is usually very small, and is usually less than 8°. In addition, the angular bandwidth of the DIC component is usually less than 10°. Therefore, the exit pupil of the system is extremely small, and is only 1 millimeter to 3 millimeters.

FIG. 6b shows a near-eye display system that is based on an incoherent plane image source micro projection engine. An image source plane is an image plane, and an effective opening angle of a light ray projected by each image point to a DIC is mainly subject to an angular bandwidth of the DIC component, namely, a Bragg domain. Due to angle selectivity of the DIC, a projected light ray outside the Bragg domain can transparently pass through the DIC without being redirected to an exit pupil position. Therefore, an exit pupil is also small.

FIG. 6c shows a near-eye display system that is based on an LBS micro projection engine. A semiconductor laser is used as a light source. Intensity and spectrums of emergent laser beams are modulated based on image information. Two-dimensional time sequence scanning is performed on modulated incident laser beams by using a micro scanning mirror. Scanned incident laser beams are projected to a DIC component, and are focused on a pupil position of a human eye through diffraction redirection of the DIC component and further propagate to a retina for imaging. An exit pupil dimension of the system is approximately one point.

It can be learned from FIG. 6a to FIG. 6c that, subject to an angular bandwidth of a DIC component, a pixel dimension of an image source component, or an optical path of a laser beam retinal scanning mechanism, an Eyebox dimension in an AR near-eye display system based on the DIC is excessively small, severely affecting user experience.

To expand an exit pupil to improve user experience, an embodiment of this application provides a display device module. FIG. 7a to FIG. 7d separately describe composition and an optical path of the display device module.

Figure 7A:
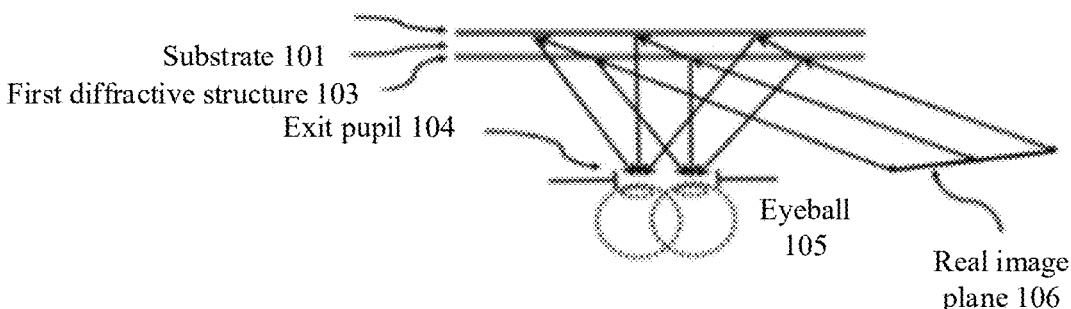
FIG. 7a is a schematic diagram of an embodiment of a display device module according to an embodiment of this application.

FIG. 7a is a schematic diagram of an embodiment of the display device module according to an embodiment of this application. A DIC component in the display device module includes a substrate 101, a first diffraction structure 103, and a second diffraction structure 102. In addition, 104 is a system exit pupil, 105 is an observation range of a human eye, and 106 is a real image plane projected by a micro projection engine.

The first diffraction structure 103 is parallel to the second diffraction structure 102. Optionally, the first diffraction structure 103 may be a volume holographic grating VHG, a surface rising grating SRG, a metasurface, or a micro lens array, and is not specifically limited herein. The second diffraction structure 102 may be a volume holographic grating VHG, a surface rising grating SRG, a metasurface, or a micro lens array, and is not specifically limited herein.

Optionally, the substrate 101 is an optical transparent medium, and includes a material such as glass or optical plastic. There is good optical parallelism between upper and lower surfaces of the substrate 101.

Optionally, if the substrate 101 is not disposed between the first diffraction structure 103 and the second diffraction structure 102, the first diffraction structure 103 and the second diffraction structure 102 need to be supported by using a support component such as a frame structure, so that the first diffraction structure 103 is parallel to the second diffraction structure 102. In this implementation, a light ray transmitted from the first diffraction structure 103 propagates to the second diffraction structure 102 through air. Because a refractive index of air is less than a refractive index of the optical transparent medium, a larger offset distance may be obtained.

Optionally, the micro projection engine may be a plane image source component or a point image source component, and is not specifically limited herein. The plane image source component includes an SLM image source component, such as an LCoS micro display or a DMD micro display, or an incoherent plane micro image source, such as an OLED micro display or an LCD micro display. The point image source component includes an LBS-based laser scanning micro display.

Figure 7B:
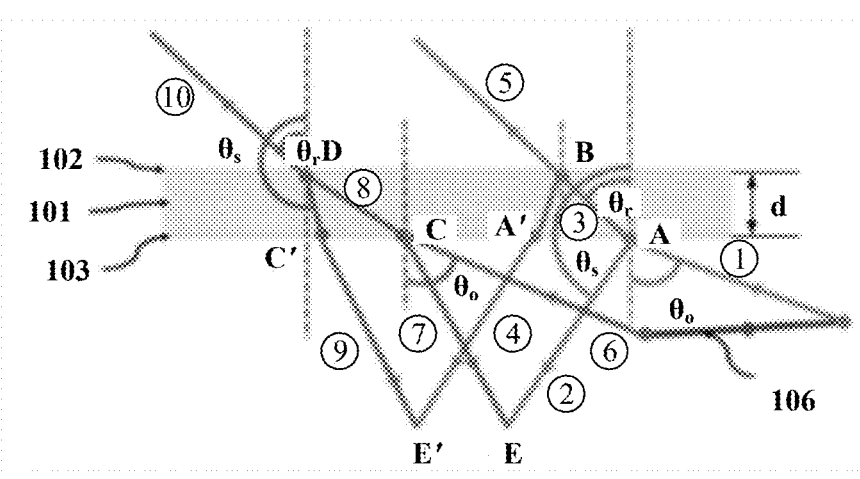
FIG. 7b is a schematic diagram of light ray transmission of a display device module according to an embodiment of this application.

A corresponding light ray transmission process is shown in FIG. 7b. It is assumed that a light ray ① and a light ray ⑥ are two edge light rays of parallel beams that are emitted by the real image plane projected by the micro projection engine and that carry image information of the entire image plane, the light ray ① is irradiated to a point A of the first diffraction structure and is divided into two light rays at the point A, including positive first-order diffracted light ② and zero-order transmitted light ③, and the zero-order transmitted light ③ is irradiated to a point B of the second diffraction structure and is also divided into two light rays: positive first-order diffracted light ④ and zero-order transmitted light ⑤. The diffraction structures are designed and processed, so that a grating vector of the point A is the same as a grating vector of the point B, that is, it is ensured that the light rays ② and ④ are emergent as parallel light rays. A horizontal distance between the light rays ② and ④ at the exit pupil position 104 is a distance between the point A and a point A'. Likewise, the light ray ⑥ is incident to a point C and the light ray is divided into two light rays, including positive first-order diffracted light ⑦ and zero-order transmitted light ⑧. The zero-order transmitted light ⑧ is irradiated to a point D in the second diffraction structure and is also divided into two light rays: positive first-order diffracted light ⑨ and zero-order transmitted light ⑩. The diffraction structures are designed and processed, so that a grating vector of the point C is the same as a grating vector of the point D, that is, it is ensured that the light rays ⑦ and ⑨ are emergent as parallel light rays. A distance between the point C and a point C' is the same as the distance between the point A and the point A', and is an exit pupil expansion amount. The light rays ② and ⑦ converge at a point E within a first exit sub-pupil corresponding to the first diffraction structure, to enter the human eye, and the human eye observes the image information that is of the entire image plane and that is carried by the parallel beams. In addition, the light rays ④ and ⑨ converge at a point E' within an expanded exit sub-pupil corresponding to the second diffraction, to enter the human eye. When moving to the point E', the human eye may also observe the complete image information.

It should be noted that a light ray incidence point, for example, the point A, in the first diffraction structure 103 may be understood as a first grating area of the first diffraction structure, a light ray incidence point, for example, the point B, in the second diffraction structure 102 may be understood as a second grating area of the second diffraction structure, and a micro physical structure of the grating area may determine a grating vector. The grating vector of the point A is the same as the grating vector of the point B, that is, a diffraction structure of the first grating area is the same as a diffraction structure of the second grating area.

For a light ray that carries image information and that is projected from the image plane to the DIC, only a propagation path of parallel beams propagating in one direction is provided in an optical path in FIG. 7b. Actually, the light ray projected from the image plane to the DIC is limited to an effective opening angle by an angular bandwidth of the DIC. The following uses a near-eye display system based on an SLM micro projection engine as an example for description.

If the micro projection engine is based on an SLM component, the effective opening angle is further limited by a diffraction angle of the SLM component, that is, the effective opening angle further needs to be not greater than the diffraction angle. For optical path propagation in which the effective opening angle is considered, refer to FIG. 7c.

Figure 7C:
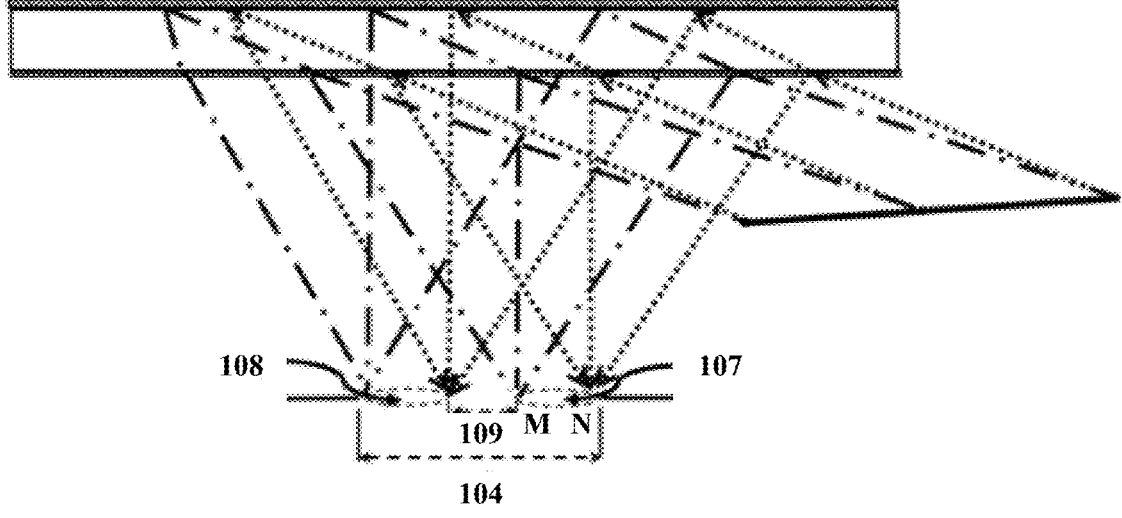
FIG. 7c is a schematic diagram in which a display device module projects a light ray to a DIC within an effective opening angle according to an embodiment of this application.

In FIG. 7c, each image point on the image plane projects light rays to the DIC within the effective opening angle. For clarity, only two light rays located at edges of the opening angle are drawn in the figure. In the figure, left edge light rays emitted by image points on the image plane converge at a left edge point M of an exit sub-pupil 107 after being diffracted through the first diffraction structure, right edge light rays emitted by the image points converge at a right edge point N of the exit sub-pupil 107 after being diffracted through the first diffraction structure, and an area between the left and right edge points is the exit sub-pupil 107 corresponding to the first diffraction structure and is also an exit pupil that can be implemented by a DIC with a single diffraction structure. In this embodiment of this application, the DIC component has a plurality of diffraction structures. After propagating to the second diffraction structure, the light rays projected by each image point on the image plane to the DIC within the effective opening angle are diffracted and converged into an expanded exit sub-pupil 108, that is, the human eye may also see a complete projected image in the exit sub-pupil 108. It should be noted that a hole area 109 (that is, an area through which no image light ray passes) may exist between the exit sub-pupil 107 and the exit sub-pupil 108. However, to ensure that an image field of view is not lost when the human eye continuously moves between the exit sub-pupil 107 and the exit sub-pupil 108, a dimension of the hole area 109 needs to be less than a size of a pupil of the human eye, that is, it is ensured that when the human eye continuously moves in a system exit pupil obtained by combining the areas 107, 108, and 109, there is always an exit sub-pupil area that has an overlapping part with the pupil of the human eye.

It should be noted that the exit sub-pupil 107 and the exit sub-pupil 108 are at a same distance to the DIC component, namely, a same exit pupil distance. The two exit sub-pupils may be adjacent to each other on a pre-designed exit pupil plane, or a hole area 109 of a specific size may exist between the two exit sub-pupils. This is not specifically limited herein. Optionally, the dimension of the hole area 109 is less than or equal to 3 millimeters.

Figure 7D:
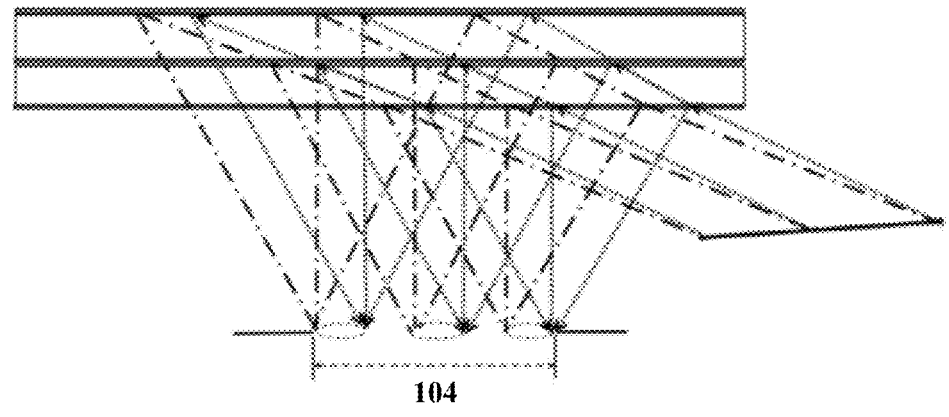
FIG. 7d is a schematic diagram of another embodiment of a display device module according to an embodiment of this application.

It should be noted that the DIC components in the display device modules shown in FIG. 7a to FIG. 7c are all designed as double diffraction structures. Optionally, the DIC component may include three or more diffraction structures. A quantity of diffraction structures may be determined based on an actual pupil expansion requirement and a thickness requirement of the DIC component. This is not specifically limited herein. The following provides descriptions by using an example in which the DIC component includes three diffraction structures. FIG. 7d is a schematic diagram of another embodiment of the display device module according to an embodiment of this application.

One substrate material (optional) and one diffraction structure are further added to the foregoing DIC component with two diffraction structures, so that a third exit sub-pupil is obtained through expansion at the exit pupil position, to further increase a dimension of the system exit pupil, as shown in FIG. 7d. By continuously increasing quantities of substrate materials and diffraction structures, more exit sub-pupils can be obtained through expansion, to implement a larger dimension of the system exit pupil.

Based on the foregoing analysis, when moving within a combined system exit pupil range obtained through expansion by using a DIC component with a plurality of diffraction structures, the human eye can always observe image information. In addition, a plurality of beams emergent after light rays that are projected by a single image point on the image plane and that are located in a Bragg domain pass through the plurality of diffraction structures remain approximately parallel and form a unique image point on a retina after entering the human eye. Therefore, even if the pupil of the human eye simultaneously has overlapping areas with two exit sub-pupils in a moving process, crosstalk does not occur.

Figure 8:
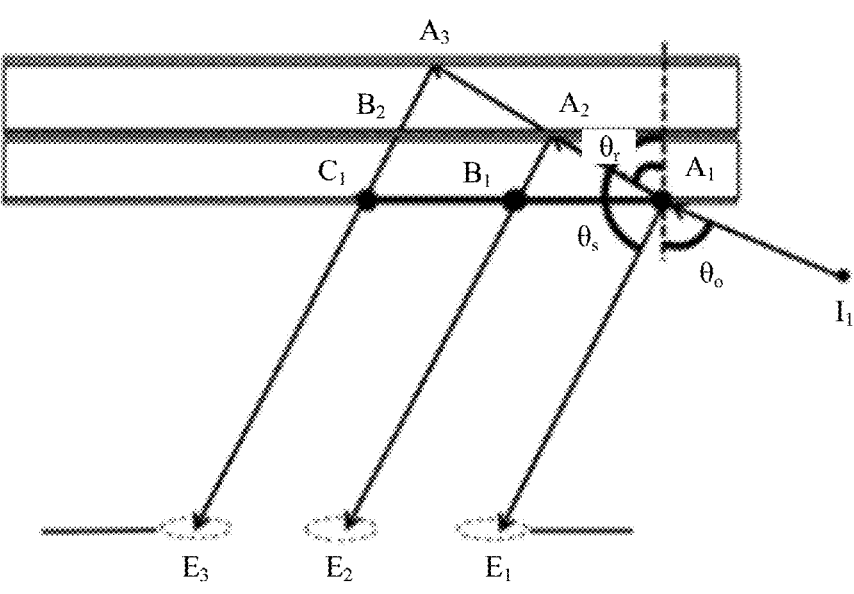
FIG. 8 is a schematic design diagram of diffraction efficiency of a display device module according to an embodiment of this application.

FIG. 8 is a schematic design diagram of diffraction efficiency of a display device module according to an embodiment of this application.

The following further describes related physical parameters of a pupil expansion effect of a plurality of diffraction structures by using, as an example, a propagation path obtained after a light ray projected by a single image point on an image plane to an effective opening angle of a DIC passes through three diffraction structures.

Referring to FIG. 8, a light ray $I_1A_1$ projected by any image point $I_1$ on an image plane to a DIC component is divided into two light rays at an incidence point A1 in a first diffraction structure, one light ray is redirected by the diffraction structure to a point $E_1$ in a first exit sub-pupil, and the other light ray continues to propagate to an incidence point $A_2$ in a second diffraction structure according to the law of refraction. At $A_2$, the light ray is further divided into two light rays, one light ray is redirected by the diffraction structure and projects to a point $E_2$ in a second exit sub-pupil after passing through an emergence point $B_1$ of the light ray in the first diffraction structure, and the other light ray continues to propagate to an incidence point $A_3$ in a third diffraction structure, is redirected by the diffraction structure at $A_3$, and projects to a point $E_3$ in a third exit sub-pupil after passing through an emergence point $B_2$ of the light ray in the second diffraction structure and an emergence point $C_1$ of the light ray in the first diffraction structure. It should be noted that the light ray is diffracted only at $A_1$, $A_2$, and $A_3$. Because incidence angles of the light ray at $B_1$, $B_2$, and $C_1$ fall outside an angular bandwidth of a grating structure, the light ray can directly pass through $B_1$, $B_2$, and $C_1$. Diffraction efficiency of diffraction structures at $A_1$, $A_2$, and $A_3$ is designed, for example, design values of the diffraction efficiency are respectively set to 30%, 50%, and 100%, so that intensity of the light rays reaching $E_1$, $E_2$, and $E_3$ may be approximately the same. It should be noted that a specific value of diffraction efficiency of each diffraction structure is not limited herein.

Still referring to FIG. 8, the existence of the second diffraction structure introduces a light ray $B_1E_2$ in the second exit sub-pupil, $B_1E_2$ is parallel to a diffracted light ray $A_1E_1$ generated by the first diffraction structure, and the two light rays correspond to the same light ray $I_1A_1$ incident to the DIC component. A distance $A_1B_1$ between the emergence points of the two light rays in the DIC component is an exit pupil expansion amount introduced by the second diffraction structure. A value of the distance is related to a thickness and a material refractive index of the first and second diffraction structures and a substrate between the first and second diffraction structures, and is also related to a value of a Bragg incidence angle $\theta_0$ of the diffraction structure. Similarly, the existence of the third diffraction structure introduces a light ray $C_1E_3$ in the third exit sub-pupil, and $C_1E_3$ is parallel to the emergent light ray $A_1E_1$ corresponding to the first diffraction structure and the emergent light ray $B_1E_2$ corresponding to the second diffraction structure and corresponds to the same light ray $I_1A_1$ incident to the DIC component. A distance $C_1B_1$ between the emergence points of $C_1E_3$ and $B_1E_2$ in the DIC component is an exit pupil expansion amount introduced by the third diffraction structure. A value of the distance is related to a thickness and a material refractive index of the second and third diffraction structures and a substrate between the second and third diffraction structures, and is also related to the value of the Bragg incidence angle $\theta_0$ of the diffraction structure. The exit pupil expansion amount $A_1B_1$ introduced by the second diffraction structure is used as an example. According to a simple geometric operation, the following may be obtained:

$$A_1B_1 = d \times (\tan(\pi - \theta_s) + \tan\theta_r), \text{ where}$$

d is a total thickness of the first and second diffraction structures and the substrate between the first and second diffraction structures, $\theta_s$ is a diffraction angle size and is related to a system FoV size and spatial distribution of grating vectors, and $\theta_r$ is a size of a refraction angle of the incident light ray during entrance to the diffraction structure from air. Assuming that both refractive indexes of the diffraction structure and the substrate material are n, $$\theta_r = \sin^{-1}\frac{\sin\theta_o}{n}.$$

Figure 9A:
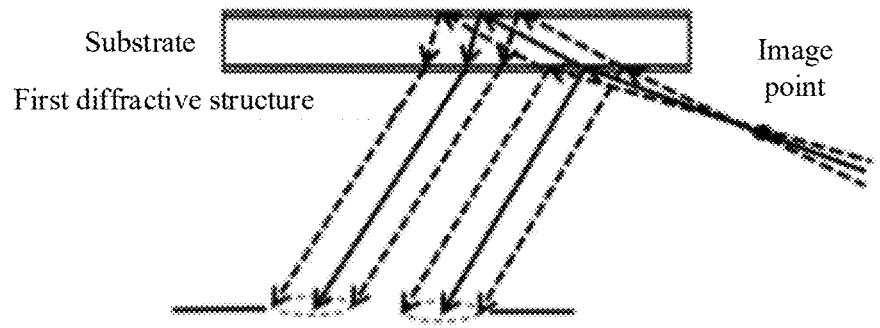
FIG. 9a is a schematic diagram of an optical path of a display device module according to an embodiment of this application.
Figure 9B:
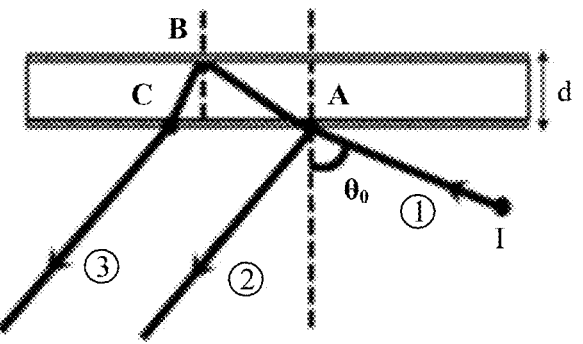
FIG. 9b is a schematic diagram of another optical path of a display device module according to an embodiment of this application.

The following describes a specific method for calculating an exit pupil size. Refer to FIG. 9a and FIG. 9b.

FIG. 9a is a schematic diagram of an optical path of a display device assembly according to an embodiment of this application. FIG. 9b is a schematic diagram of another optical path of a display device assembly according to an embodiment of this application.

Assuming that a VHG grating is used as a diffraction structure, a diameter of a single grating structure satisfies d=50 mm, and an exit pupil distance satisfies r=30 mm, it is learned, according to a geometric relationship $2*\tan(\theta/2)=d/r$, that a system field of view $\theta$ is equal to 80°. If an angular bandwidth of non-periodic grating is calculated according to the kogelnik diffraction theory (in this embodiment, it is assumed that an incident light ray is monochromatic light), it can be learned that an angular bandwidth corresponding to a position with a smallest grating period is 2°, and an angular bandwidth corresponding to a position with a largest grating period is 8°. Because an image of an entire field of view needs to be observed at an exit pupil position, calculation needs to be performed based on the angular bandwidth corresponding to the position with the smallest grating period.

A DIC component with two diffraction structures is used as an example. System composition, an optical path, and related physical parameters are shown as follows: In FIG. 9a, light rays within a diffraction angle 2° that are emergent from an image point I may be transmitted to an exit pupil position through diffraction. If an observed virtual image is imaged at infinity, that is, a projected real image is located on a front focal plane of the diffraction structure, that is, an object distance is equal to 30 mm, a corresponding Bragg incidence angle $\theta_0$ is 60°, that is, angles between a diffractive optical element plane and two edge light rays are respectively 290 and 31°. An exit pupil dimension corresponding to a single grating structure, namely, a single exit sub-pupil dimension, may be calculated as 15/tan 29°−15/tan 31°=2 mm (tan 29°=0.554, tan 30°=0.577, and tan 31°=0.601. Herein, it is considered that a light ray indecent within the Bragg angle, namely, a solid line in the figure, is located at an angle bisector position of the edge light rays. Due to an incidence position offset, emergent light rays may be not perfectly parallel. The offset is slight, and therefore is not perceived by a human eye). A light ray ① in FIG. 9b is a light ray corresponding to the solid line in FIG. 9a. The light ray ① is separately diffracted when being incident to the two grating structures. Because a grating vector of a point A is the same as a grating vector of a point B, emergent light rays ② and ③ are parallel. Assuming that a total thickness d of the diffraction structures and a substrate is 2 mm, and a material refractive index satisfies n=1.5, it may be learned, through calculation according to a light ray transmission geometric relationship, that a distance between two exit sub-pupil center points, namely, the point A and a point C, is about 3 mm, that is, an expanded system exit pupil dimension is 5 mm.

It should be noted that a total thickness and a refractive index of two adjacent diffraction structures and a substrate between the two adjacent diffraction structures and a value of a preset Bragg incidence angle determine an exit pupil expansion amount that can be obtained each time one diffraction structure is added. Different system exit pupil dimensions can be obtained by selecting different design parameters. A specific exit pupil dimension may be designed based on an actual requirement.

If a quantity of diffraction structures of the DIC component is increased from 2 to 3 by using the foregoing same parameters, an exit pupil expansion amount of 3 mm may be obtained again, that is, a system exit pupil is further expanded to 8 mm.

Therefore, it may be deduced that if a display device module includes N diffraction structures parallel to each other, substrates between the diffraction structures have a same thickness and refractive index, an exit pupil dimension of a single diffraction structure is D, and an exit pupil dimension of two diffraction structures is D+K, an exit pupil dimension of the N diffraction structures is D+(N−1)K.

The following describes a method for manufacturing the diffraction structure in the foregoing DIC component. A DIC component that includes two VHG gratings is used as an example.

Figure 10A:
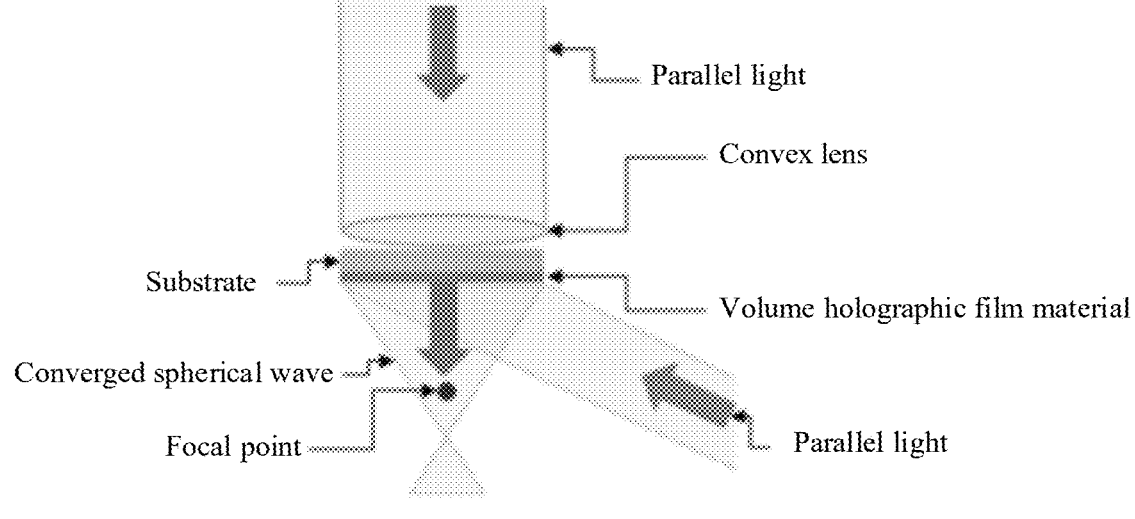
FIG. 10a is a schematic diagram of a diffraction structure manufacturing method according to an embodiment of this application.

First, a method for manufacturing, when a near-eye display system uses a micro projection engine that is based on an SLM component, the DIC component that includes two VHG gratings is introduced. To implement an off-axis light ray convergence function of the VHG grating, each VHG grating may be manufactured by performing interference exposure on a photopolymer film material by using a converged spherical wave and parallel light waves at a specific inclination angle. Refer to FIG. 10a. Both the two VHG gratings need to meet a condition that corresponding incidence points of an incident light ray that meets a Bragg condition in a second VHG grating and a first VHG grating have a same grating vector. To meet this condition, a possible manufacturing method is as follows:

(1) Parameters such as a thickness and a refractive index of the VHG gratings and a substrate, a Bragg incidence angle, and an exit pupil distance are determined.

(2) Spatial positions of two interference light waves are enabled to be fixed and keep unchanged in a processing process of the two gratings, to ensure that the processed gratings have a same field of view (an aperture angle).

(3) Two volume holographic film materials of a same dimension and shape are obtained through cutting, and two same substrate materials are prepared.

(4) A first volume holographic film material is attached to a lower surface of a first substrate, and is placed under the two interference light waves for exposure, to obtain the first VHG grating. This step needs to ensure that a spatial position and a spatial posture angle of the first volume holographic film material need to ensure that parallel reference light waves are incident to the first volume holographic film material at the Bragg angle, and a distance from a convergence focal point position of a converged spherical object light wave to the first volume holographic film material is a preset exit pupil distance.

(5) A second volume holographic film material is attached to an upper surface of a second substrate, and is placed under the two interference light waves for exposure, to obtain the second VHG grating. This step needs to ensure that a spatial posture angle of the second volume holographic film material is exactly the same as the spatial posture angle of the first volume holographic film material, but the second film material is upward displaced relative to the first film material by a substrate thickness in a normal line direction of a film material plane.

(6) The second VHG grating is detached from the second substrate, and is attached to an upper surface of the first substrate by offsetting the second VHG grating by a specific distance relative to an attachment position of the first VHG grating, to obtain the required DIC component that includes two VHG gratings, where corresponding incidence points of an incident light ray that meets the Bragg condition in the second VHG grating and the first VHG grating have a same grating vector. A specific offset amount during attachment of the second VHG grating may be obtained through simple calculation based on parameters such as the Bragg incidence angle, and the thickness and the refractive index of the gratings and the substrate by using the laws of light ray refraction and diffraction in geometric optics.

Figures 11A, 11B:
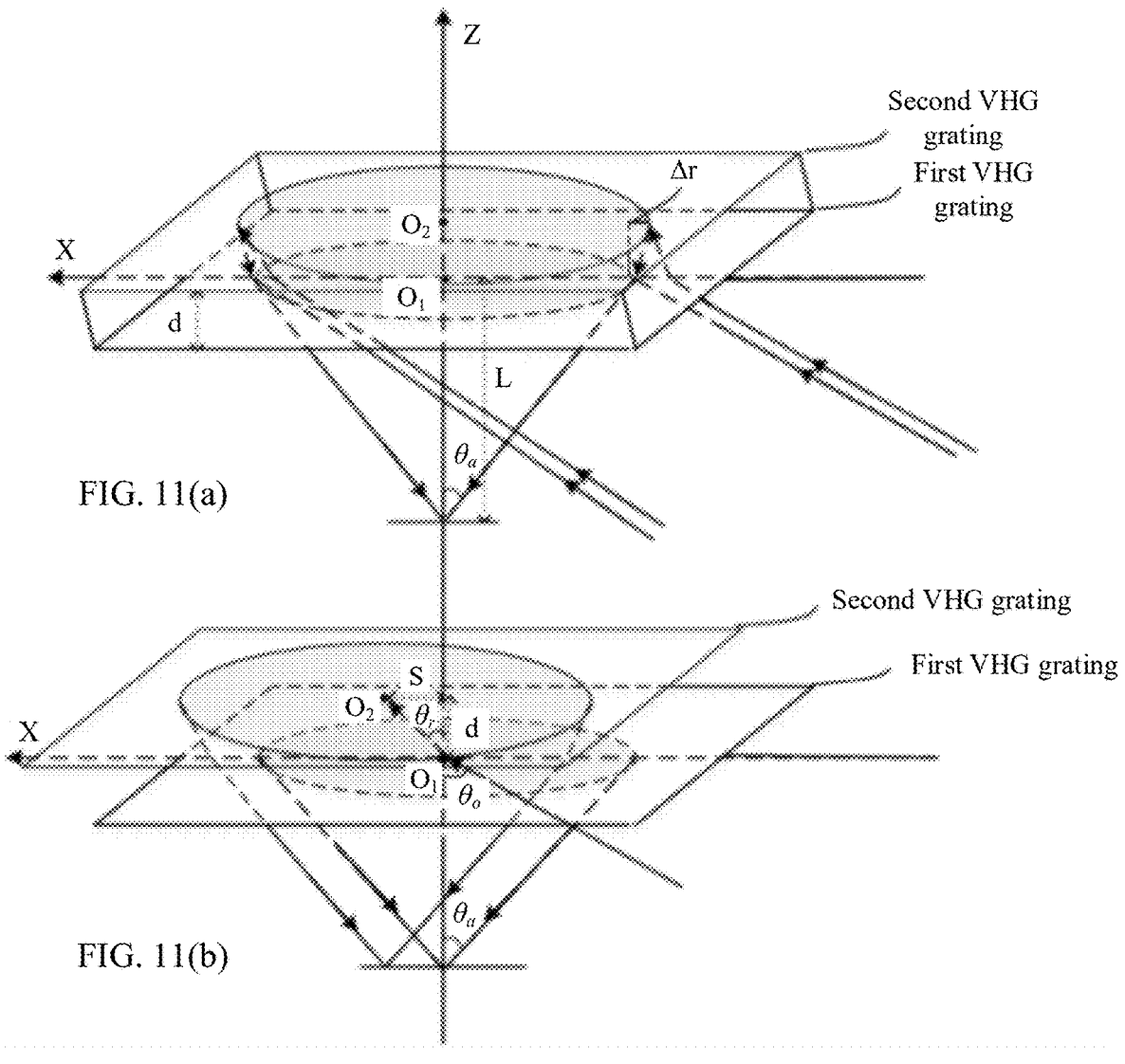
FIG. 11(a) and FIG. 11(b) are another schematic diagram of a diffraction structure manufacturing method according to an embodiment of this application.

The following further provides descriptions with reference to the foregoing processing steps. FIG. 11(a) and FIG. 11(b) are another schematic diagram of a diffraction structure manufacturing method according to an embodiment of this application.

In the foregoing step (5), a spatial position relationship between the second VHG grating and the first VHG grating that are obtained after the exposure is shown in FIG. 11(a). To clearly present relative spatial positions of the two VHG gratings during exposure, the two VHG gratings are placed in a same spatial coordinate system. The first VHG grating corresponds to a smaller circular gray area on a lower surface of a substrate in FIG. 11(a), and the second VHG grating corresponds to a larger circular gray area on an upper surface of the substrate in FIG. 11(a). It may be learned that a micro-nano diffraction structure of the second VHG grating is amplified at an equal ratio compared with a micro-nano diffraction structure of the first VHG grating. An amplification factor K is related to design parameters of the DIC component, such as the aperture angle, the exit pupil distance L (a distance from the DIC component to a pupil of a human eye), and a thickness d and a refractive index n of the two volume holographic film materials and the substrate between the two volume holographic film materials. A specific relational formula is as follows:

$$K = 1 + \frac{\Delta r}{L \times \tan\theta_a},$$

where $\Delta r$ may be obtained through calculation by using the following formula:

$$\Delta r = d \times \tan\left(\sin^{-1}\left(\frac{\sin\theta_a}{n}\right)\right)$$

In the foregoing step (6), for the two VHG gratings attached to the upper and lower surfaces of the same substrate, corresponding incidence points of an incident light ray that meets the Bragg condition in the two gratings need to have equal grating vectors. To implement this requirement, the second grating needs to be attached after a circle center $Q_2$ of the second grating is offset relative to a circle center $O_1$ of the first grating by a distance s along the surface of the substrate, as shown in FIG. 11(b). A value of s is related to the Bragg angle $\theta_o$, the thickness d and the refractive index n of the two volume holographic film materials and the substrate between the two volume holographic film materials. A specific relational formula is as follows:

$$s = d \times \tan\left(\sin^{-1}\left(\frac{\sin\theta_o}{n}\right)\right)$$

It should be particularly noted that, because the micro-nano diffraction structure of the second VHG grating is slightly amplified at the equal ratio compared with the micro-nano diffraction structure of the first VHG grating, grating vectors of the two gratings at corresponding incidence points of a Bragg incident light ray in the two gratings are not strictly equal in a mathematical sense but are approximately equal, and two parallel light rays that are obtained after the Bragg incident light ray is redirected through the two gratings and that are emergent from the DIC are also not strictly parallel in the mathematical sense but are parallel in a human eye perception sense.

It should be noted that the foregoing manufacturing process is only a feasible method for obtaining the DIC component that includes two VHG gratings, and is not a unique method. Other manufacturing methods are not listed one by one herein.

If a diffraction structure is an SRG component or a metasurface component, spatial distribution of vectors of two gratings may be determined based on parameters such as a thickness and a refractive index of the gratings and a substrate, a Bragg incidence angle, and an exit pupil distance, an off-axis light ray convergence requirement to be implemented, and a requirement that corresponding incidence points of an incident light ray that meets a Bragg condition in a second diffraction structure and a first diffraction structure have a same grating vector; and processing is performed by using an etching processing technology or nanoimprint lithography, to obtain the required two diffraction structures. A specific processing process is not described herein in detail.

A working process of a near-eye display system using a DIC component that includes two diffraction structures and that is manufactured by using the foregoing process and a micro projection engine that is based on an SLM component is as follows:

(1) The SLM component in the micro projection engine modulates incident coherent light, and generates a real image through diffraction, where the real image is located in a 1× focal length of the DIC component. In addition to the SLM component, the micro projection engine may further include necessary beam shaping, spatial filtering, and optical path guiding components. Details are not described herein.

(2) A light ray of each image point of the real image continues to be projected to the DIC component, and a projection angle of the micro projection engine is adjusted, so that an angle at which the projected light ray is incident to a surface of a first diffraction structure of the DIC component is located in a Bragg domain.

(3) Some incident light rays are diffracted inside the first diffraction structure, and diffracted light rays converge in a first exit sub-pupil area. If a VHG component is used, the diffraction structure may be processed by performing interference exposure on a photopolymer film material by using a converged spherical wave generated after parallel light waves pass through a convex lens and parallel light waves at a specific inclination angle, to implement an off-axis light ray convergence function.

(4) Some incident light rays continue to propagate through the first diffraction structure, and reach a surface of a second grating structure and are diffracted, and diffracted light rays converge in a second exit sub-pupil area. The second exit sub-pupil area and the first exit sub-pupil area are at a same distance to the DIC component. The two exit sub-pupil areas may be adjacent to each other in spatial position, or a gap of a specific size may exist between the two exit sub-pupil areas. However, to ensure that an image field of view is not lost in a process in which a pupil of a human eye continuously moves from an exit sub-pupil area to another exit sub-pupil area, a dimension of the gap needs to be less than a dimension of the pupil of the human eye. In conclusion, the two diffraction structures are designed, so that an exit pupil of a single diffraction structure is replicated while it is ensured that a system field of view is not affected, to expand a system exit pupil.

It should be noted that if a micro projection engine of a near-eye display system is based on an incoherent plane image source, a display plane of the micro projection engine is a real image plane. A method for manufacturing a diffraction structure in a display device module is similar to the method corresponding to the SLM micro projection engine. Details are not described herein.

When a micro projection engine of a near-eye display system is based on a point scanning image source such as an LBS, an image light ray incident to a DIC component is a spherical light wave whose sphere center is an incidence point of a laser source on an MEMS scanning mirror, and a diffraction structure processing method corresponding to the DIC component is different from the foregoing diffraction structure processing method of the DIC component corresponding to the plane image source micro projection engine. The following describes a process of processing a DIC component corresponding to an LBS micro projection engine. A DIC component that includes two VHG diffraction structures is used as an example for description.

Figure 10B:
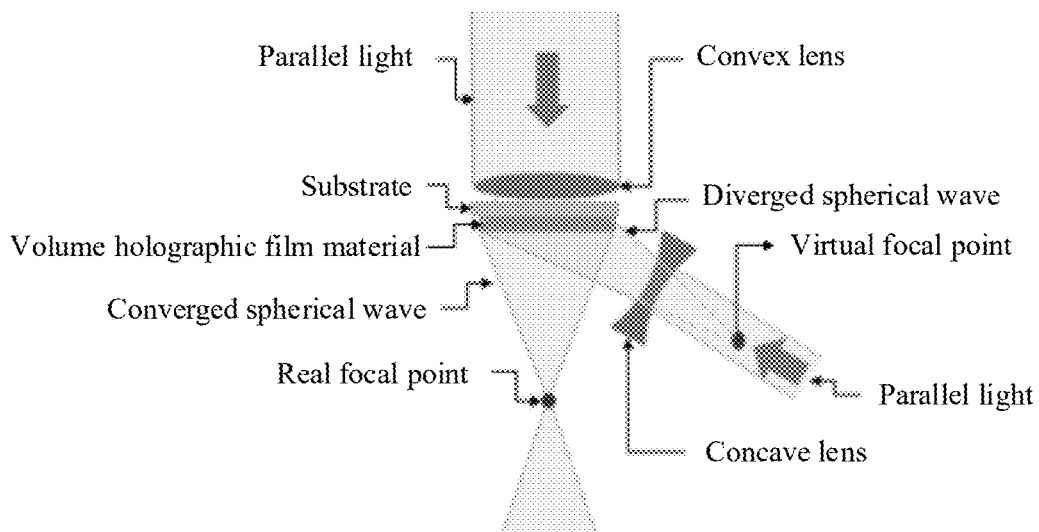
FIG. 10b is another schematic diagram of a diffraction structure manufacturing method according to an embodiment of this application.

To implement off-axis light ray convergence function, the DIC component may be processed and manufactured by performing interference exposure on a volume holographic film material on two sides of the volume holographic film material at a specific inclination angle by using one converged spherical wave (generated after parallel light waves pass through a convex lens) and one diverged spherical wave (generated after parallel light waves pass through a concave lens). Refer to FIG. 10b. Both the two VHG gratings need to meet a condition that corresponding incidence points of an incident light ray that meets a Bragg condition in a second VHG grating and a first VHG grating have a same grating vector. To meet this condition, a possible manufacturing method is as follows:

(1) Parameters such as a thickness and a refractive index of the VHG gratings and a substrate, a Bragg incidence angle, and an exit pupil distance are determined.

(2) Spatial positions of two interference light waves are enabled to be fixed and keep unchanged in a processing process of the two gratings, to ensure that the processed gratings have a same numerical aperture.

(3) Two volume holographic film materials of a same dimension and shape are obtained through cutting, and two same substrate materials are prepared.

(4) A first volume holographic film material is attached to a lower surface of a first substrate, and is placed under the two interference light waves for exposure, to obtain the first VHG grating. This step needs to ensure that a spatial position and a spatial posture angle of the first volume holographic film material need to ensure that parallel reference light waves are incident to the first volume holographic film material at the Bragg angle, and a distance from a convergence focal point position of a converged spherical object light wave to the first volume holographic film material is a preset exit pupil distance.

(5) A second volume holographic film material is attached to an upper surface of a second substrate, and is placed under the two interference light waves for exposure, to obtain the second VHG grating. This step needs to ensure that a spatial posture angle of the second volume holographic film material is exactly the same as the spatial posture angle of the first volume holographic film material, but the second film material is upward displaced relative to the first film material by a substrate thickness in a vertical direction of a film material plane.

(6) The second VHG grating is detached from the second substrate, and is attached to an upper surface of the first substrate by offsetting the second VHG grating by a specific distance relative to an attachment position of the first VHG grating, to obtain the required DIC component that includes two VHG gratings, where corresponding incidence points of an incident light ray that meets the Bragg condition in the second VHG grating and the first VHG grating have a same grating vector. A specific offset amount during attachment of the second VHG grating may be obtained through simple calculation based on parameters such as the Bragg incidence angle, and the thickness and the refractive index of the gratings and the substrate by using the laws of light ray refraction and diffraction in geometric optics.

It should be noted that the foregoing manufacturing process is only a feasible method for obtaining the DIC component that includes two VHG gratings, and is not a unique method. Other manufacturing methods are not listed one by one herein.

If a diffraction structure is an SRG component or a metasurface component, spatial distribution of vectors of two gratings may be determined based on parameters such as a thickness and a refractive index of the gratings and a substrate, a Bragg incidence angle, and an exit pupil distance, an off-axis light ray convergence requirement to be implemented, and a requirement that corresponding incidence points of an incident light ray that meets a Bragg condition in a second diffraction structure and a first diffraction structure have a same grating vector; and processing is performed by using an etching processing technology or nanoimprint lithography, to obtain the required two diffraction structures. A specific processing process is not described herein in detail.

A working process of a near-eye display system using a DIC component that includes two diffraction structures and that is manufactured by using the foregoing process and a micro projection engine that is based on an LBS device is as follows: After being reflected through an MEMS scanning mirror, a modulated laser beam onto which image information is loaded is projected to the DIC component. Each incident light ray incident to the DIC component after being reflected through the MEMS scanning mirror is divided into two light rays at an incidence point in the first diffraction structure by the diffraction structure, one light ray is converged at a first exit sub-pupil position after being redirected through the diffraction structure, and the other light ray continues to propagate to the second diffraction structure and is converged at a second exit sub-pupil position after being redirected by the diffraction structure. Therefore, a human eye can see a complete image at both the first exit sub-pupil position and the second exit sub-pupil position. The two diffraction structures are designed, so that an incidence point of an incident light ray in the first diffraction structure and an incidence point of the incident light ray in the second diffraction structure have a same grating vector. Therefore, light rays emergent from the DIC component after the incident light ray passes through the two diffraction structures are parallel, and then form a unique corresponding point on a retina after being converged by the human eye. Therefore, even if both a first exit sub-pupil and a second exit sub-pupil have overlapping areas with the pupil of the human eye, no crosstalk is observed. To ensure that no image field of view is lost when the pupil of the human eye continuously moves between the first exit sub-pupil and the second exit sub-pupil, a dimension of a gap between the two exit sub-pupils should be less than a dimension of the pupil of the human eye. After the foregoing requirement is met, a total dimension of the two exit sub-pupils and the gap between the two exit sub-pupils is a system exit pupil dimension.

Figure 12:
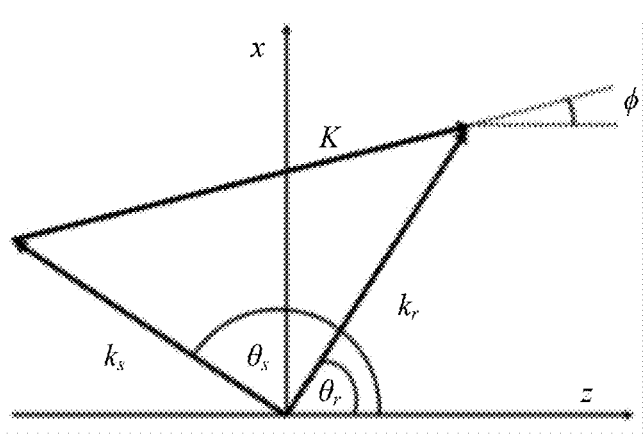
FIG. 12 is a schematic diagram of a relationship between a grating vector, reference light, and object light according to an embodiment of this application.

FIG. 12 is a schematic diagram of a relationship between a grating vector, reference light, and object light according to an embodiment of this application. The following describes design of diffraction efficiency in a diffraction structure processing process.

To ensure that brightness of light rays respectively emergent to two exit sub-pupils after incident light projected to two diffraction structures is diffracted is as consistent as possible, diffraction efficiency of the two diffraction structures needs to be designed to appropriately reduce diffraction efficiency of a first diffraction structure, so that only a part of the incident light ray is diffracted to a first exit sub-pupil after the incident light ray reaches the first diffraction structure, and the remaining part continues to propagate to a second diffraction structure and is diffracted in the second diffraction structure to a second exit sub-pupil at maximum diffraction efficiency. For the two gratings, a possible diffraction efficiency arrangement is target diffraction efficiency 50% of the first diffraction structure and target diffraction efficiency 100% of the second diffraction structure. If three diffraction structures are used, target diffraction efficiency of first, second, and third diffraction structures may be 30%, 50%, and 100%. In summary, for a plurality of diffraction structures, diffraction efficiency of each diffraction structure may be designed, so that brightness of fields of view of images seen by a human eye from exit sub-pupils are basically consistent. A specific value of the diffraction efficiency of each diffraction structure is not limited herein.

Diffraction efficiency of a diffraction structure is jointly determined by parameters such as a reference light vector $K_r$, a reference light incidence angle $\theta_r$, an object light vector $K_s$, an object light incidence angle $\theta_s$, a grating vector K, a grating vector angle $\phi$, a refractive index spatial modulation degree and a thickness of a volume holographic film material, and an offset amount of an incidence angle $\theta$, of a projected light ray of a micro projection engine relative to the Bragg reference angle $\theta_r$.

The following uses a VHG as an example to describe how a diffractive component obtains target diffraction efficiency during processing. A diffractive optical element is designed based on a Bragg diffraction condition, and a diffraction equation is described by using a kogelnik coupling light wave principle. In a diagram of a geometric relationship between the reference light vector $K_r$, the reference light incidence angle $\theta_r$, the object light vector $K_s$, the object light incidence angle $\theta_s$, the grating vector K, and the grating vector angle $\phi$, the angles are all angles between the physical quantities and a z-axis, and a z-axis direction is a normal line direction of a grating plane.

When incident light meets a Bragg condition, that is, an incident light vector is equal to the reference light vector $K_r$, the grating obtains maximum diffraction efficiency; otherwise, diffraction efficiency decreases. Specifically, a phase mismatch factor is described as follows:

$$\delta=\Delta\theta K \sin(\phi-\theta_i), \text{ where}$$

$\Delta\theta$ is the offset of the incidence angle $\theta_i$ of the projected light ray relative to the Bragg reference angle $\theta_r$, and coupling strength v of the grating and a Bragg mismatch reference quantity are represented as follows:

$$v = \frac{\pi\Delta nd}{\lambda(\cos\theta_r\cos\theta_s)^{1/2}}; \text{and}$$

$$\xi = \frac{\delta d}{2\cos\theta_s},$$

where $\Delta$n is a refractive index spatial modulation degree of a material, and d is a thickness of a diffraction thin film material.

A calculation formula of diffraction efficiency of a reflective diffractive optical element is as follows:

$$\eta = \frac{sh^2(v^2-\xi^2)^{1/2}}{sh^2(v^2-\xi^2)^{1/2}+[1-(\xi/v)^2]}$$

24

Target diffraction efficiency of each diffraction grating may be customized according to the foregoing relational formula, so that exit sub-pupils are consistent in light intensity. When a pupil of a user relatively moves, light rays of images obtained from different exit sub-pupils are consistent in intensity, thereby improving user experience.

It may be clearly understood by a person skilled in the art that, for purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, mechanical, or another form.

The units described as separate parts may or may not be physically separate, and parts displayed as units may or may not be physical units, that is, may be located in one position, or may be distributed on a plurality of network units. A part or all of the units may be selected based on actual requirements to achieve the objectives of the solutions in embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software functional unit and is sold or used as an independent product, the integrated unit may be stored in a computer-readable storage medium. Based on such an understanding, the technical solutions of this application essentially, or the part contributing to a current technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to a part of technical features thereof, without departing from the scope of the technical solutions of embodiments of this application.

What is claimed is:

1. A diffractive image combiner comprising:

a first grating area disposed in a first diffractive optical element (DOE);

a second grating area disposed in a second DOE, wherein a relative position of the first DOE and the second DOE support emergent light rays parallel to a human eye; and a grating vector of a first incidence point in the first DOE is the same as a grating vector of a second incidence point in the second DOE to further support parallel emergent light rays, wherein the first incidence point is located in a first grating area and the second incidence point is located in a second grating area, wherein an incident light ray at the first incidence point meets a Bragg condition and is converted into a first diffracted light ray and a first transmitted light ray, wherein the first transmitted light ray at the second incidence point is converted into a second diffracted light ray, wherein the first grating area of the first DOE is used to convert first parallel incident beams, whose projection angles fall within a Bragg domain, into first diffracted beams and first transmitted beams, wherein the first diffracted beams converge at a first focal point, wherein the first transmitted beams are converted into second diffracted beams at the second grating area of the second DOE, wherein the second diffracted beams converge at a second focal point, and wherein a first exit pupil dimension associated with the first focal point and a second exit pupil dimension associated with the second focal point are substantially equal.

2. The diffractive image combiner according to claim 1, wherein the incident light ray and the first diffracted light ray are located on a same side of the first DOE.

3. The diffractive image combiner according to claim 1, wherein the first DOE comprises a first volume holographic grating (VHG), a first surface rising grating (SRG), a first metasurface, or a first micro lens array; and wherein the second DOE comprises a second VHG, a second SRG, a second metasurface, or a second micro lens array.

4. The diffractive image combiner according to claim 1, wherein diffraction efficiency of the first DOE is lower than diffraction efficiency of the second DOE.

5. A head-mounted display device comprising a left-eye display and a right-eye display, wherein the left-eye display comprises the diffractive image combiner according to claim 1, and wherein the right-eye display comprises the diffractive image combiner according to claim 1.

6. The diffractive image combiner according to claim 1 further comprising a third DOE parallel to the second DOE, wherein the second DOE is located between the first DOE and the third DOE, wherein a grating vector of a third incidence point in the third DOE is the same as the grating vector of the second incidence point, wherein the second incidence point is further used to convert the first transmitted light ray into the second diffracted light ray and a second transmitted light ray, wherein the second transmitted light ray is incident to the third incidence point, and wherein a third grating area is used to convert the second transmitted light ray into a third diffracted light ray.

7. The diffractive image combiner according to claim 6, wherein the third grating area is disposed in the third DOE, wherein the first grating area is used to convert the first parallel incident beams whose projection angles fall within the Bragg domain into the first diffracted beams and the first transmitted beams, wherein the first diffracted beams converge at the first focal point, wherein the first transmitted beams are incident to the second grating area, wherein the second grating area is used to convert the first transmitted beams into second diffracted beams and second transmitted beams, wherein the second diffracted beams converge at a second focal point, wherein the second transmitted beams are incident to the third grating area, wherein the third grating area is used to convert the second transmitted beams into third diffracted beams, wherein the third diffracted beams converge at a third focal point through diffraction, and wherein a distance from the third focal point to the diffractive image combiner is equal to both the distance from the second focal point to the diffractive image combiner and the distance from the first focal point to the diffractive image combiner.

8. The diffractive image combiner according to claim 6, wherein the diffraction efficiency of the second DOE is lower than diffraction efficiency of the third DOE.

9. The diffractive image combiner according to claim 1 further comprising a substrate disposed between the first DOE and the second DOE, wherein upper and lower surfaces of the substrate are optically parallel.

10. The diffractive image combiner according to claim 9, wherein a material of the substrate is an optical transparent material comprising glass or optical plastic.

11. A display device module comprising a micro projection engine and a diffractive image combiner, wherein the diffractive image combiner comprises:

a first grating area disposed in a first diffractive optical element (DOE);

a second grating area disposed in a second DOE, wherein a relative position of the first DOE and the second DOE support emergent light rays parallel to a human eye; and a grating vector of a first incidence point in the first DOE is the same as a grating vector of a second incidence point in the second DOE to further support parallel emergent light rays, wherein the first incidence point is located in a first grating area and the second incidence point is located in a second grating area, wherein an incident light ray at the first incidence point meets a Bragg condition and is converted into a first diffracted light ray and a first transmitted light ray, and wherein the first transmitted light ray at the second incidence point is converted into a second diffracted light ray, wherein the first grating area of the first DOE is used to convert first parallel incident beams, whose projection angles fall within a Bragg domain, into first diffracted beams and first transmitted beams, wherein the first diffracted beams converge at a first focal point, wherein the first transmitted beams are converted into second diffracted beams at the second grating area of the second DOE, wherein the second diffracted beams converge at a second focal point, and wherein a first exit pupil dimension associated with the first focal point and a second exit pupil dimension associated with the second focal point are substantially equal; and wherein the micro projection engine projects incident light rays whose angles fall within a Bragg domain to the diffractive image combiner, wherein the first diffracted light ray is among similarly diffracted light rays that form a first exit sub-pupil, wherein the second diffracted light ray is among similarly diffracted light rays that form a second exit sub-pupil, and wherein an exit pupil of the display device module comprises the first exit sub-pupil and the second exit sub-pupil.

12. The display device module according to claim 11, wherein the micro projection engine comprises a plane image source component or a point image source component, wherein the plane image source component comprises a space light modulator (SLM) image source component and an incoherent plane micro image source, and wherein the point image source component comprises a laser beam scanner (LBS) component.

13. The display device module according to claim 11, further comprising a frame for fastening the micro projection engine and the diffractive image combiner.

14. The display device module according to claim 11, further comprising at least one of the following: a communications apparatus, a processor, and a power supply apparatus.

15. A virtual reality (VR) device comprising the display device module according to claim 11.

16. A near-eye display device comprising the display device module according to claim 11.

17. An augmented reality (AR) device comprising a display device module comprising a micro projection engine and a diffractive image combiner, wherein the diffractive image combiner comprises:

a first grating area disposed in a first diffractive optical element (DOE);

a second grating area disposed in a second DOE, wherein a relative position of the first DOE and the second DOE support emergent light rays parallel to a human eye; and a grating vector of a first incidence point in the first DOE is the same as a grating vector of a second incidence point in the second DOE to further support parallel emergent light rays, wherein the first incidence point is located in a first grating area and the second incidence point is located in a second grating area, wherein an incident light ray at the first incidence point meets a Bragg condition and is converted into a first diffracted light ray and a first transmitted light ray, wherein the first transmitted light ray at the second incidence point is converted into a second diffracted light ray, wherein the first grating area of the first DOE is used to convert first parallel incident beams, whose projection angles fall within a Bragg domain, into first diffracted beams and first transmitted beams, wherein the first diffracted beams converge at a first focal point, wherein the first transmitted beams are converted into second diffracted beams at the second grating area of the second DOE, wherein the second diffracted beams converge at a second focal point, and wherein a first exit pupil dimension associated with the first focal point and a second exit pupil dimension associated with the second focal point are substantially equal; and wherein the micro projection engine projects incident light rays whose angles fall within a Bragg domain to the diffractive image combiner, wherein the first diffracted light ray is among similarly diffracted light rays that form a first exit sub-pupil, wherein the second diffracted light ray is among similarly diffracted light rays that form a second exit sub-pupil, and wherein an exit pupil of the display device module comprises the first exit sub-pupil and the second exit sub-pupil.

18. The AR device according to claim 17, wherein the micro projection engine comprises a plane image source component or a point image source component, wherein the plane image source component comprises a space light modulator (SLM) image source component and an incoherent plane micro image source, and wherein the point image source component comprises a laser beam scanner (LBS) component.

19. The AR device according to claim 17, wherein the display device module comprises a frame for fastening the micro projection engine and the diffractive image combiner.

20. The diffractive image combiner according to claim 1, wherein the incident light ray and the first diffracted light ray are located on different sides of the first DOE.

* * * * *